United States Patent [19]
Schwegel et al.

[11] Patent Number: 5,315,870
[45] Date of Patent: May 31, 1994

[54] HOUSING FOR AN AIR FLOW RATE METER

[75] Inventors: Thomas Schwegel, Vaihingen/Enz; Hans-Peter Stiefel, Ditzingen, both of Fed. Rep. of Germany

[73] Assignee: Robert Bosch GmbH, Stuttgart, Fed. Rep. of Germany

[21] Appl. No.: 936,962

[22] Filed: Aug. 28, 1992

[30] Foreign Application Priority Data

Aug. 28, 1991 [DE] Fed. Rep. of Germany ....... 4128448

[51] Int. Cl.5 .............................................. G01F 5/00
[52] U.S. Cl. ................... 73/202.5; 73/118.2
[58] Field of Search .................. 73/118.2, 202, 202.5, 73/204.21, 273

[56] References Cited

U.S. PATENT DOCUMENTS

| | | | |
|---|---|---|---|
| 4,393,697 | 7/1983 | Sato et al. | 73/118.2 |
| 4,517,837 | 5/1985 | Oyama et al. | 73/202.5 |
| 4,598,583 | 7/1986 | Steinhauser | 73/202 |

FOREIGN PATENT DOCUMENTS

| | | |
|---|---|---|
| 0096842 | 6/1983 | European Pat. Off. . |
| 0350612 | 6/1989 | European Pat. Off. . |
| 2305743 | 8/1974 | Fed. Rep. of Germany . |
| 2622035 | 11/1977 | Fed. Rep. of Germany . |
| 3103170 | 1/1982 | Fed. Rep. of Germany . |
| 3222129 | 12/1983 | Fed. Rep. of Germany . |
| 8611134.5 | 8/1986 | Fed. Rep. of Germany . |
| 3542433 | 12/1987 | Fed. Rep. of Germany . |
| 0109816 | 6/1983 | Japan .................................. 73/202 |

*Primary Examiner*—Herbert Goldstein
*Attorney, Agent, or Firm*—Edwin E. Greigg; Ronald E. Greigg

[57] ABSTRACT

A housing for an air flow rate meter is embodied by two housing parts joined together by a detent connection, so that the assembly is reduced to a single operation, and screws and nuts are omitted. The housing for air flow rate meters is especially suitable for fuel injection systems of mixture-compressing internal combustion engines with externally supplied ignition, or air-compressing, self-igniting internal combustion engines.

16 Claims, 2 Drawing Sheets

HOUSING FOR AN AIR FLOW RATE METER

BACKGROUND OF THE INVENTION

The invention is based on a housing for an air flow rate meter to a mixture-compressing internal combustion engine with externally supplied ignition. A housing for an air flow rate meter is already known (German Offenlegungsschrift 31 03 170), which along with a second housing part in which a throttle device is disposed forms a throttle valve neck for mixture-compressing internal combustion engines with externally supplied ignition; the housing for the air flow rate meter is embodied as a Venturi nozzle. An air bypass line begins upstream of the Venturi nozzle and discharges into the narrowest cross section of the Venturi nozzle, and the air flow rate meter is disposed in that line. The mechanical coupling of the two housing parts in the prior art is typically in the form of a screw connection, as shown for instance in European Patent Application EP 00 96 842 A1. The use of screws and nuts represents considerable expenditure for material. Moreover, the various operations that are required result in a long assembly time, entailing high production costs.

During operation, the danger exists that the screw fastening will loosen unintentionally as a result of the dynamic strains in the form of vibration and impact originating in the engine; the functional capability of the air flow rate meter is impaired thereby. For instance, the engine power can be reduced quite considerably from infiltrated air that is aspirated through leaking portions of the connection between the two housing parts, these leaks being caused by loosening of the fastening screws.

To assure operational safety, other, cost intensive provisions such as spring rings, which adequately secure the screw fastening, are necessary.

OBJECT AND SUMMARY OF THE INVENTION

The housing according to the invention for an air flow rate meter has an advantage over the prior art that in a simple manner, its production cost is lowered considerably compared with conventional housings, and easier assembly is made possible. The elements, such as screws, which are necessary in the prior art in order to join the housing for an air flow rate meter to a lower housing part are omitted in the housing according to the invention.

Moreover, no additional provisions are necessary that secure the connection against unintentional loosening from impacts or jarring. Another advantage is a considerably reduced expense for assembly. The process of joining the two housing parts is limited to a single operation.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
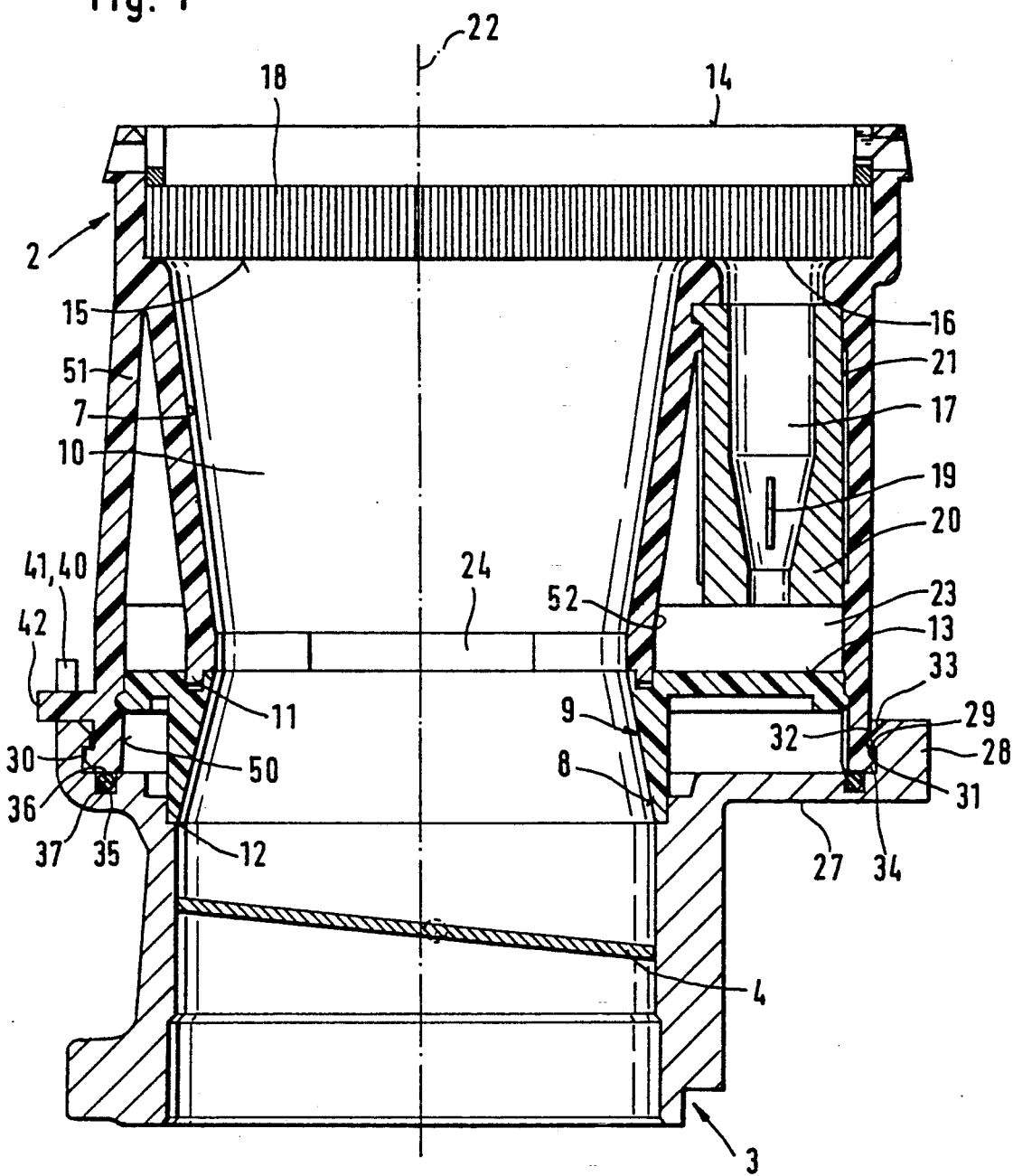
FIG. 1 shows a first exemplary embodiment of a housing according to the invention.

In FIG. 1, the drawing shows a housing for an air flow rate meter, for example for mixture-compressing internal combustion engines with externally supplied ignition, which has an upper housing part 2 and downstream of which there is a flow conduit body 3, which for instance has a throttle valve 4. The upper housing part 2 has a convergent, nozzle-like segment 7, which is adjoined downstream by a divergent, nozzle-like segment 8 in a lower housing part 9, which together with the convergent segment 7 forms a Venturi nozzle 10. The joining of the convergent segment 7 of the upper housing part 2 and the divergent segment 8 of the lower housing part 9 is done by means of a tongue-and-groove connection 11 encompassing a contact face of the two parts.

The downstream end of the divergent segment 8 of the lower housing part 9 meshes with an encompassing recess 12 of the flow conduit body 3 and is thus fastened between the upper housing part 2 and the flow conduit body 3. Extending outward radially from the divergent segment 8, the lower housing part 9 has a transverse segment 13, which rests radially on an inner wall 50 of an annular wall 51 of the upper housing part 2 that surrounds the convergent segment 7.

An inlet cross section 14 of the upper housing part 2 that is located upstream of the convergent segment 7 and forms part of the annular wall 51, and through which cross section all the air flows, filtered by means of an air filter, not shown, is split into a partial inlet cross section 15 of the convergent segment 7 and a partial inlet cross section 16 of an air bypass line 17 and is covered completely by a flow smoother 18. The air bypass line 17, beginning at the partial inlet cross section 16, extends within a recess 21 between the convergent segment 7 and the annular wall 51 through a flow conduit insert 20, which extends parallel to a flow conduit axis 22 of the housing 2, 9, and in an adjoining annular conduit 23, which is defined by the inner wall of the annular wall 51, an outer wall 52 of the convergent segment 7, and the transverse segment 13 of the lower housing part 9 in the recess 21, and it discharges into the Venturi nozzle 10, for example in its narrowest cross section, in the form of an outflow opening 24 extending partway around. An air flow rate meter 19, such as a hot-film air flow rate meter, is disposed in the air bypass line 17 in the flow conduit insert 20.

Toward the upper housing part 2, the flow conduit body 3 has a radially outwardly extending flange 27, which is adjoined by a collar 28 extending in the axial direction toward the upper housing part 2 and extending at least partway around; a hooklike first protrusion 29 extending at least partway around is formed on the inside 32 of the collar, toward the flow conduit axis 22, so that a detent groove 30 that extends at least partway around is formed on the inside 32 of the collar 28; a corresponding second hooklike protrusion 31, extending at least partway around and formed on the outside of the end of the annular wall 51 of the upper housing part 2 toward the flow conduit body 3, locks into place in this detent groove 30.

When the upper housing part 2 and the flow conduit body 3 are joined together, chamfers 33a, 34a facing toward one another and formed on the two hooklike protrusions 29, 31 slide past one another, and during the joining process, because of the elasticity of the material, they cause a contrary deflection of the hooklike protrusions 29, 31. The force required for the joining process is jointly determined definitively by the angle of the chamfers 33, 34. After the joining process, a virtually strain-free, form-fitting component fastening exists.

The flange 27 of the flow conduit body 3 has an encompassing groove 35a, whose course corresponds to that of a wider face end 36, toward the flow conduit body 3, of the annular wall 51 of the upper housing part 2. A sealing element 37, such as an O ring, is let into the groove 35 and assures a gas-tight connection of the upper housing part 2 to the flow conduit body 3.

Assembly of the upper housing part 2 and the flow conduit body 3 at the correct angle to one another is assured by means of two prongs 40, 41 extending axially along the circumference of the collar 28; they are spaced apart by a distance that is equivalent to approximately the width of one further radially extending prong 42, disposed on the outside of the annular wall 51 of the upper housing part 2 and engaging the space between the prongs 40, 41 without play.

Figure 2:
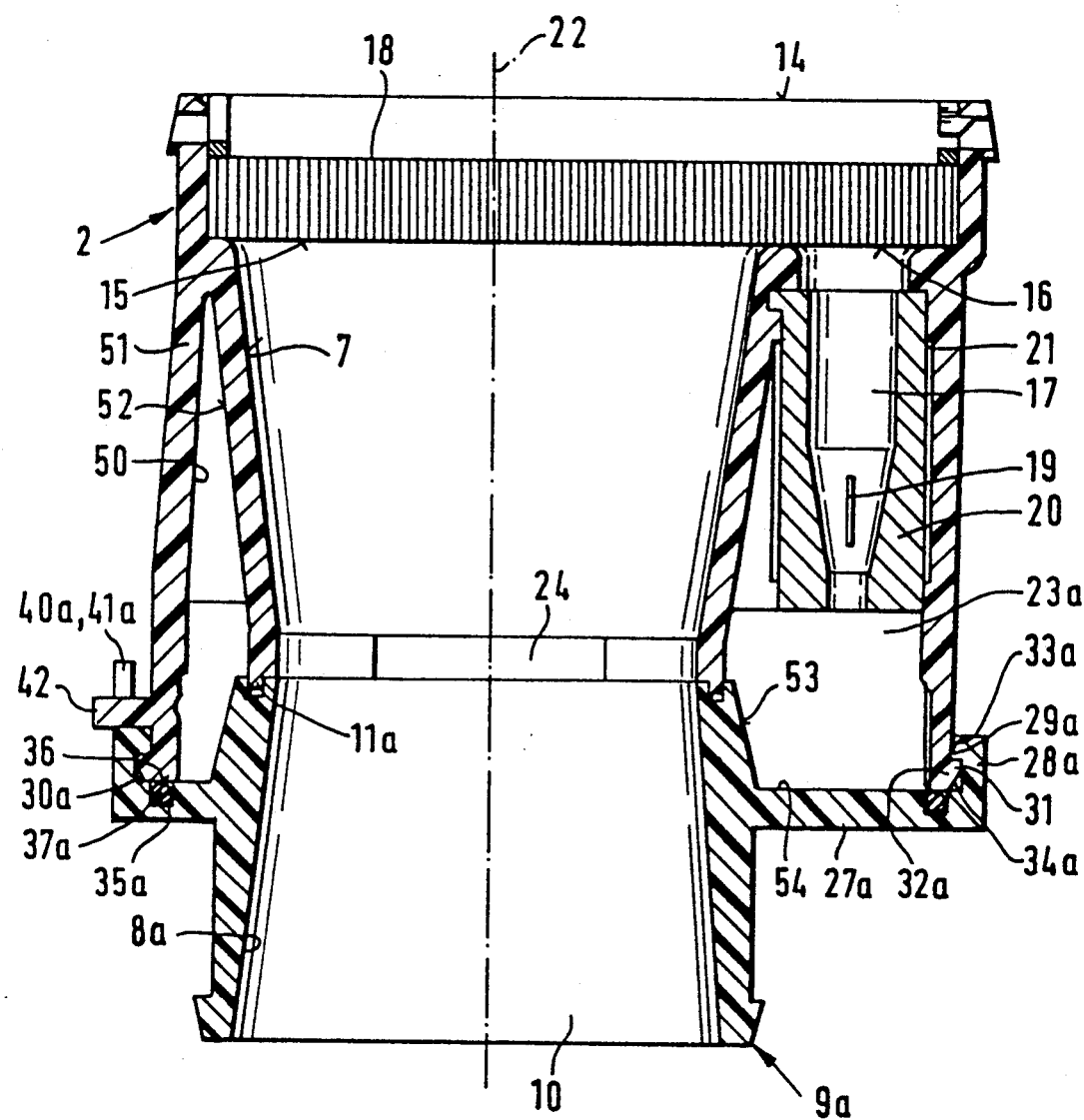
FIG. 2 shows a second exemplary embodiment of the housing according to the invention.

FIG. 2 of the drawing shows a second exemplary embodiment of a housing for an air flow rate meter. Compared with the exemplary embodiment of FIG. 1, components that remain the same and function the same are identified by the same reference numerals.

Unlike the first exemplary embodiment of FIG. 1, the flow conduit body 3 and the throttle valve 4 are omitted here. An upper housing part 2, which is structurally identical to the upper housing part 2 of the first exemplary embodiment, is coupled to a lower housing part 9a by means of a detent connection.

The air bypass line 17 beginning at the partial inlet cross section 16 of the upper housing part 2 extends within a recess 21 between the convergent segment 7 and the annular wall 51, through a flow conduit insert 20 that extends parallel to a flow conduit axis 22 of the housing 2, 9a, and in an adjoining annular conduit 23a, which is defined by the inner wall 50 of the annular wall 51, an outer wall 52 of the convergent segment 7, an outer wall 53 of the divergent segment 8a and a face 54, toward the upper housing part 2, of a flange 27a.

The lower housing part 9a has a divergent, nozzle-like segment 8a, which via an encompassing tongue-and-groove connection 11a formed on a contact face immediately adjoins the convergent segment 7 of the upper housing part 2. Toward the upper housing part 2, the lower housing part 9a has a flange 27a extending radially outward, which is adjoined by a collar 28a, extending at least partway around and extending in the axial direction toward the upper housing part 2; a hooklike first protrusion 29a extending at least partway around is embodied on the inside 32a of the collar 28a, toward the flow conduit axis 22, creating a detent groove 30a, which extends at least partway around, on the inside 32a of the collar 28a; a corresponding second hooklike protrusion 31 extending at least partway around and formed on the outside of the end of the annular wall 51 of the upper housing part 2 toward the lower housing part 9a locks into place in this detent groove 30a.

When the upper housing part 2 and the lower housing part 9a are joined together, chamfers 33a, 34a facing toward one another and formed on the two hooklike protrusions 29a, 31 slide past one another, and during the joining process, because of the elasticity of the material, they cause a contrary deflection of the hooklike protrusions 29a, 31. The force required for the joining process is jointly determined definitively by the angle of the chamfers 33, 34. After the joining process, a virtually strain-free, form-fitting component fastening exists.

The flange 27a of the lower housing part 9a has an encompassing groove 35a, whose course corresponds to that of a wider face end 36, toward the lower housing part 9a, of the annular wall 51 of the upper housing part 2. A sealing element 37a, such as an O ring, is let into the groove 35a and assures a gas-tight connection of the upper housing part 2 to the lower housing part 9a.

Assembly of the upper housing part 2 and the lower housing part 9a at the correct angle to one another is assured by means of two prongs 40a, 41a extending axially along the circumference of the collar 28a; they are spaced apart by a distance that is equivalent to approximately the width of one further radially extending prong 42, disposed on the outside of the annular wall 51 of the upper housing part 2 and engaging the space between the prongs 40a, 41a without play.

The housing according to the invention can be used both for fuel injection systems of mixture-compressing internal combustion engines with externally supplied ignition, and for air-compressing, self-igniting internal combustion engines.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A housing for an air flow rate meter, comprising an upper housing part with an inner convergent, nozzle-like segment and a lower housing part with an inner divergent, nozzle-like segment, wherein the inner convergent segment and the inner divergent segment form a Venturi nozzle, an air bypass line in which an air flow rate meter is disposed, said air bypass line begins upstream of the inner convergent segment and discharges into the Venturi nozzle, the lower housing part is coupled to a flow conduit body, and the upper housing part (2) is joined to the flow conduit body (3) by means of a detent connection (29, 30, 31).

2. A housing as defined by claim 1, in which said flow conduit body (3) includes a first, radially extending protrusion (29), extending at least partway around on the flow conduit body (3), and said upper housing part (2) includes a second, radially extending protrusion (31) extending at least partway around the upper housing part (2), and the first protrusion (29) and second protrusion (31) at least partially overlap one another to form the detent connection (29, 30, 31).

3. A housing as defined by claim 1, in which the flow conduit body (3) has a flange (27) and a collar (28) extending in an axial direction, and the first protrusion (29) is formed on the collar (28), wherein between the first protrusion (29) and the flange (27), a detent groove (30) is formed which is engaged by the second protrusion (31) of the upper housing part (2).

4. A housing as defined by claim 1, in which a sealing element (37) is provided between the upper housing part (2) and the flow conduit body (3).

5. A housing as defined by claim 2, in which a sealing element (37) is provided between the upper housing part (2) and the flow conduit body (3).

6. A housing as defined by claim 3, in which a sealing element (37) is provided between the upper housing part (2) and the flow conduit body (3).

7. A housing as defined by claim 3, in which the flange (27) of the flow conduit body (3) has an encompassing groove (35), in which an O ring (37) is embedded.

8. A housing as defined by claim 6, in which the flange (27) of the flow conduit body (3) has an encompassing groove (35), in which an O ring (37) is embedded.

9. In an internal combustion engine a housing for an air flow rate meter, which has an upper housing part with an inner convergent, nozzle-like segment and a lower housing part with an inner divergent, nozzle-like segment, wherein the convergent segment and the divergent segment form a Venturi nozzle, an air bypass line in which an air flow rate meter is disposed, said air bypass line begins upstream of the convergent segment and discharges into the Venturi nozzle, and the upper housing part (2) is joined to the lower housing part (9a) by means of a detect connection (29, 30, 31).

10. A housing as defined by claim 9, in which said lower housing part (9a) includes a first, radially extending protrusion (29a), extending at least partway around, the lower housing part (9a), said upper housing part (2) includes a second, radially extending protrusion (31), extending at least partway around the upper housing part (2), and the first protrusion (29a) and second protrusion (31) at least partially overlap one another to form the detent connection (29a, 30a, 31).

11. A housing as defined by claim 9, in which a sealing element (37a) is provided between the upper housing part (2) and the lower housing part (9a).

12. A housing as defined by claim 10, in which a sealing element (37a) is provided between the upper housing part (2) and the lower housing part (9a).

13. A housing for an air flow rate meter for an internal combustion engine, which has an upper housing part with an inner convergent, nozzle-like segment and a lower housing part with an inner divergent, nozzle-like segment, wherein the convergent segment and the divergent segment form a Venturi nozzle, an air bypass line in which an air flow rate meter is disposed, said air bypass line begins upstream of the convergent segment and discharges into the Venturi nozzle, and the upper housing part (2) is joined to the lower housing part (9*1*) by means of a detent connection (29, 30, 31), the lower housing part (9a) has a flange (27a) and a collar (28a) extending in he axial direction, and a first protrusion (29a) is formed on the collar (28a), a detent groove (30a) is formed between the first protrusion (29) and the flange (27a), said detent groove (30a), is engaged by a second protrusion (31) of the upper housing part (2).

14. A housing for an air flow rate meter, which has an upper housing part with an inner convergent, nozzle-like segment and a lower housing part with an inner divergent, nozzle-like segment, wherein the convergent segment and the divergent segment form a Venturi nozzle, an air bypass line in which an air flow rate meter is disposed, said air bypass line begins upstream of the convergent segment and discharges into the Venturi nozzle, and the upper housing part (2) is joined to the lower housing part (9a) by means of a detent connection (29, 30, 321), the lower housing part (9a) has a flange (27a) and a collar (28a) extending in the axial direction, a first protrusion (29a) is formed on the collar (28a), a detent groove (30a) is formed between the first protrusion (29) and the flange (27a), said detent groove (30a), is engaged by a second protrusion (31) of the upper housing part (2), and a sealing element (37a) is provided between the upper housing part (2) and the lower housing part (9a).

15. A housing for an air flow rate meter, which has an upper housing part with an inner convergent, nozzle-like segment and a lower housing part with an inner divergent, nozzle-like segment, wherein the convergent segment and the divergent segment form a Venturi nozzle, an air bypass line in which an air flow rate meter is disposed, said air bypass line begins upstream of the convergent segment and discharges into the Venturi nozzle, and the upper housing part (2) is joined to the lower housing part (9a) by means of a detent connection (29, 30, 31), the lower housing part (9a) has a flange (27a) and a collar (28a) extending in the axial direction, and a first protrusion (29a) is formed on the collar (28a), a detent groove (30a) is formed between the first protrusion (29) and the flange (27a) , and said detent grovoe (30a), is engaged by a second protrusion (31) of the upper housing part (2), the flange (27a) of the lower housing part (9a) has an encompassing groove (35a), in which an O ring (37a) is embedded.

16. A housing for an air flow rate meter, which has an upper housing part with an inner convergent, nozzle-like segment and a lower housing part with an inner divergent, nozzle-like segment, wherein the convergent segment and the divergent segment form a Venturi nozzle, an air bypass line in which an air flow rate meter is disposed, said air bypass line begins upstream of the convergent segment and discharges into the Venturi nozzle, and the upper housing part (2) is joined to the lower housing part (9a) by means of a detent connection (29, 30, 31), the lower housing part (9a) has a flange (27a) and a collar (28a) extending in a axial direction, and a first protrusion (29a) is formed on the collar (28a), a detent groove (30a) is formed between the first protrusion (29) and the flange (27a), said detent groove (30a), is engaged by a second protrusion (31) of the upper housing part (2), the flange (27a) of the lower housing part (9a) has an encompassing groove (35a), in which an O ring (37a) is embedded and a sealing element (37a) provided between the upper housing part (2) and the lower housing part (9a).

* * * * *